United States Patent
Xie et al.

(10) Patent No.: US 8,449,260 B2
(45) Date of Patent: May 28, 2013

(54) COMPOSITE LOAD-BEARING ROTATING RING AND PROCESS THEREFOR

(75) Inventors: Ming Xie, Beavercreek, OH (US); Scott Francis Neis, Fairfield, OH (US); Steven Todd Slusher, Westchester, OH (US); Lee Alan Blanton, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 875 days.

(21) Appl. No.: 12/609,680

(22) Filed: Oct. 30, 2009

(65) Prior Publication Data

US 2011/0103726 A1 May 5, 2011

(51) Int. Cl.
*F01D 5/14* (2006.01)

(52) U.S. Cl.
USPC ........................................ 416/189; 416/229 R

(58) Field of Classification Search
USPC ............. 415/241.1, 215.1, 214.1; 416/229 R, 416/229 A, 179, 189
See application file for complete search history.

(56) References Cited

U.S. PATENT DOCUMENTS

| | | | |
|---|---|---|---|
| 3,501,090 A * | 3/1970 | Losee et al. ............... | 416/189 |
| 4,339,229 A * | 7/1982 | Rossman ..................... | 416/218 |
| 4,695,341 A * | 9/1987 | Matuska et al. .............. | 156/161 |
| 5,277,548 A | 1/1994 | Klein et al. | |
| 5,281,096 A | 1/1994 | Harris et al. | |
| 5,378,110 A * | 1/1995 | Ress, Jr. ..................... | 416/244 R |
| 6,283,712 B1 * | 9/2001 | Dziech et al. ................. | 416/179 |
| 6,305,905 B1 * | 10/2001 | Nagle et al. ............... | 416/204 R |
| 6,416,280 B1 | 7/2002 | Forrester et al. | |
| 6,709,538 B2 * | 3/2004 | George et al. ................ | 156/73.3 |
| 2008/0116334 A1 * | 5/2008 | Xie et al. .................. | 248/205.1 |
| 2010/0129227 A1 * | 5/2010 | Schilling et al. .......... | 416/229 A |

OTHER PUBLICATIONS

GB 1018100.6, Great Britain Search Report and Written Opinion, Feb. 28, 2011.

* cited by examiner

*Primary Examiner* — Nathaniel Wiehe
*Assistant Examiner* — Ryan Ellis
(74) *Attorney, Agent, or Firm* — General Electric Company; David J. Clement; Matthew P. Hayden

(57) ABSTRACT

Composite load-bearing rotating rings suitable for use in fan sections of gas turbine engines, and processes for their fabrication. Such a ring has at least a first portion defining an integral abutment surface adapted to abut and retain hardware of a rotating machine, at least a second portion defining an integral flange adapted to secure the ring to a support structure of the rotating machine, and an insert. Each of the first and second portions and the insert contains a polymer matrix material and a fibrous reinforcement material, and the fibrous reinforcement material within the insert is oriented predominantly in a circumferential direction of the ring for carrying both circumferential and radial loads during rotation of the ring.

18 Claims, 6 Drawing Sheets

COMPOSITE LOAD-BEARING ROTATING RING AND PROCESS THEREFOR

BACKGROUND OF THE INVENTION

The present invention generally relates to composite articles and processes for their production. More particularly, this invention is directed to the use of composite materials in the fabrication of load-bearing rotating rings, as an example, of the type used in the fan section of a gas turbine engine.

The maturation of composite technologies has increased the opportunities for the use of composite materials in a wide variety of applications, including but not limited to aircraft engines such as the GE90® and GEnx® commercial engines manufactured by the General Electric Company. Historically, the fabrication of components from composite materials has been driven by the desire to reduce weight, though increases in metal costs have also become a driving factor for some applications.

Composite materials generally comprise a fibrous reinforcement material embedded in a matrix material, such as a polymer or ceramic material. The reinforcement material serves as the load-bearing constituent of the composite material, while the matrix material protects the reinforcement material, maintains the orientation of its fibers and serves to dissipate loads to the reinforcement material. Polymer matrix composite (PMC) materials are typically fabricated by impregnating a fabric with a resin, followed by curing. Prior to impregnation, the fabric may be referred to as a "dry" fabric and typically comprises a stack of two or more fiber layers (plies). The fiber layers may be formed of a variety of materials, nonlimiting examples of which include carbon (e.g., graphite), glass (e.g., fiberglass), polymer (e.g., Kevlar®), and ceramic (e.g., Nextel®) fibers. Suitable thicknesses for the individual fiber layers and the resulting PMC material depend on the particular application of the composite structure being produced. Whether a PMC material is suitable for a given application depends on the structural requirements of the application as well as the feasibility of fabricating a PMC article having the required geometry.

BRIEF DESCRIPTION OF THE INVENTION

The present invention provides composite load-bearing rings suitable for retaining hardware on rotating machinery, such as retaining fan platforms in fan sections of gas turbine engines, and processes for their fabrication.

According to a first aspect of the invention, a process for fabricating a composite load-bearing rotating ring includes forming multiple preforms. At least a first preform of the preforms has a laminate architecture containing a polymer matrix material and a fibrous reinforcement material, and at least a second preform of the preforms contains a polymer matrix material and a fibrous reinforcement material oriented predominantly in a circumferential direction of the composite load-bearing rotating ring for carrying both circumferential and radial loads during rotation of the composite load-bearing rotating ring. The polymer matrix materials of the first and second preforms are then cured to bond the multiple preforms together and yield the composite load-bearing rotating ring. At least a first portion of the composite load-bearing rotating ring defines an integral abutment surface adapted to abut and retain hardware of a rotating machine, and at least a second portion of the composite load-bearing rotating ring defines an integral flange adapted to secure the composite load-bearing rotating ring to a support structure of the rotating machine.

Another aspect of the invention are composite load-bearing rotating rings produced by the process described above. Such a ring has at least a first portion defining an integral abutment surface adapted to abut and retain hardware of a rotating machine, at least a second portion defining an integral flange adapted to secure the composite load-bearing rotating ring to a support structure of the rotating machine, and an insert. Each of the first and second portions and the insert of the composite load-bearing rotating ring contains a polymer matrix material and a fibrous reinforcement material, and the fibrous reinforcement material within the insert is oriented predominantly in a circumferential direction of the composite load-bearing rotating ring for carrying both circumferential and radial loads during rotation of the composite load-bearing rotating ring.

A significant advantage of this invention is the ability to produce and utilize composite rings for load-bearing applications, by which manufacturing and materials costs and/or weight can be reduced without compromising the load-bearing functionality of the rings. Other aspects and advantages of this invention will be better appreciated from the following detailed description.

DETAILED DESCRIPTION OF THE INVENTION

The present invention will be described in terms of composite load-bearing rotating rings that, though capable of being adapted for use in a wide range of applications, are particularly well suited as retainer rings in the fan section of a high-bypass gas turbine engine. Various other applications to which the present invention could be applied are also within the scope of the invention.

Figure 1:
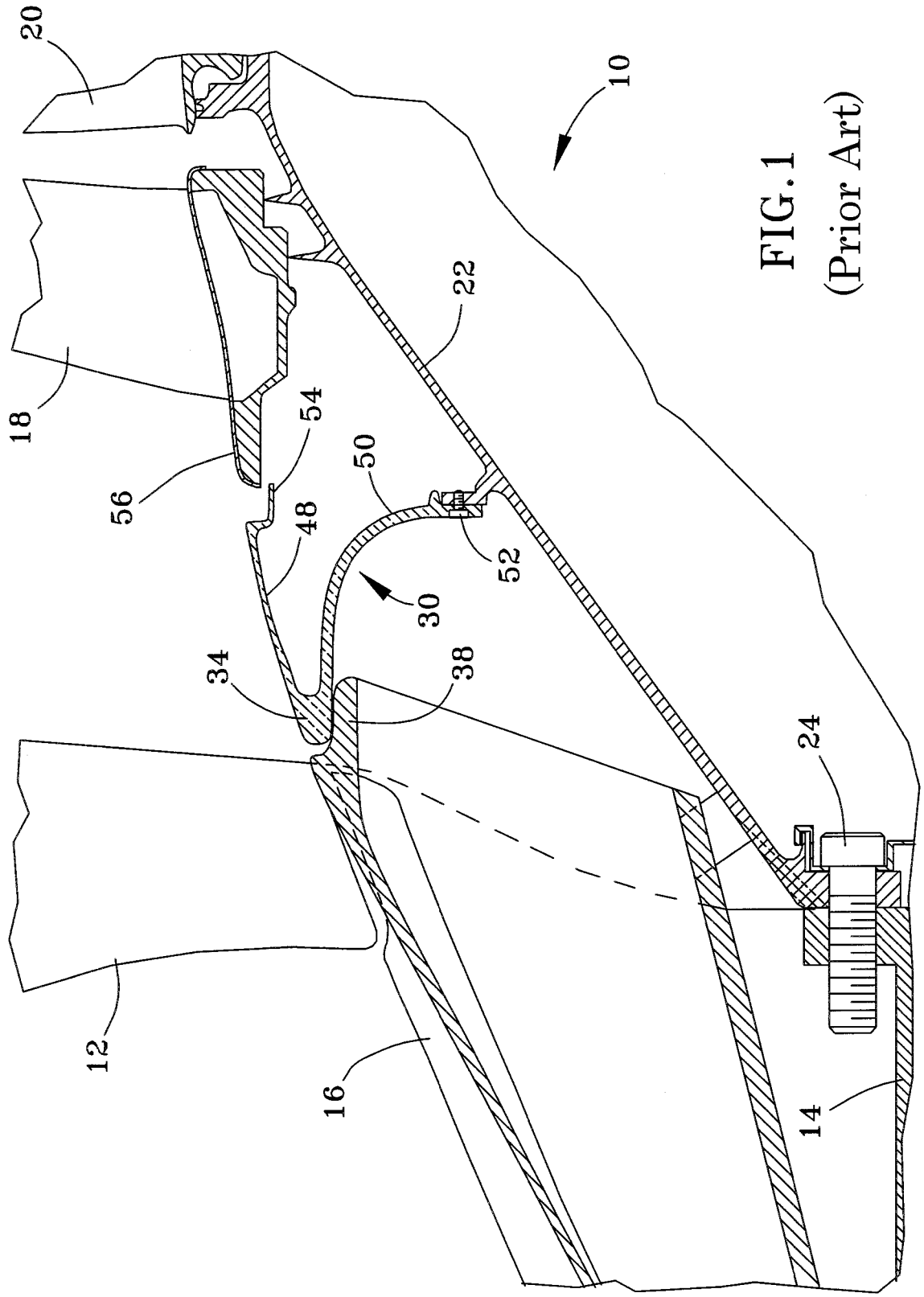
FIG. 1 schematically represents a fragmentary cross-sectional view of the aft end of a fan section of a high-bypass gas turbine engine, in which a metal platform retainer ring is installed in accordance with the existing art.
Figure 6:
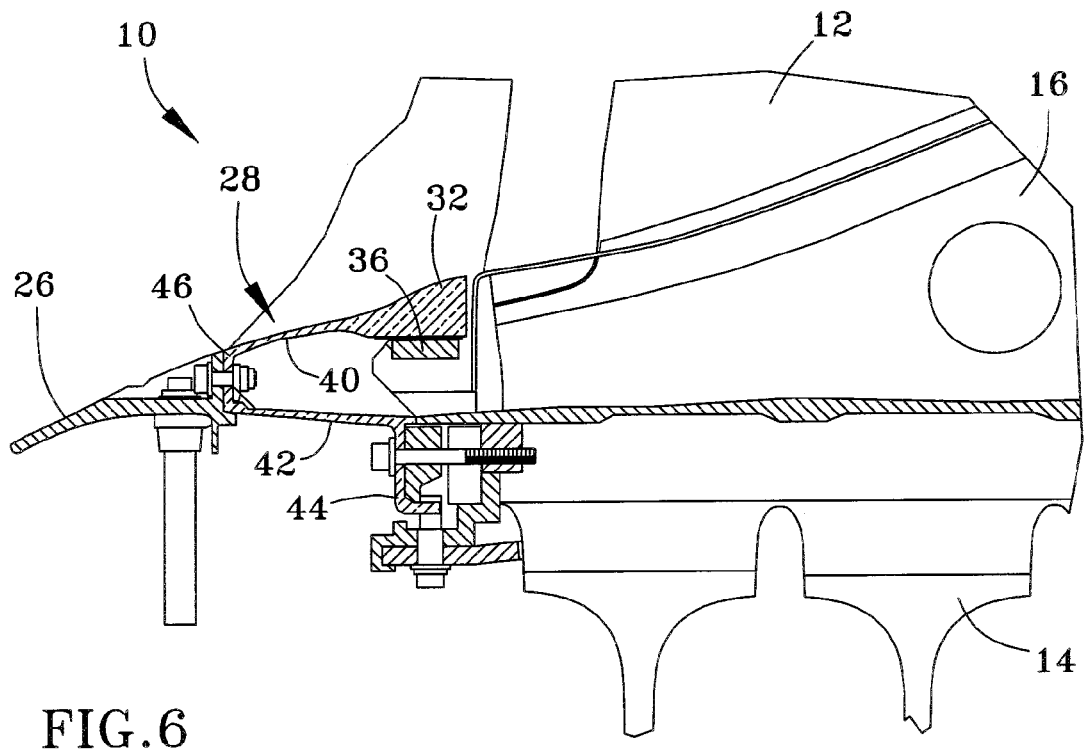
FIG. 6 schematically represents a fragmentary cross-sectional view of the forward end of a fan section of a high-bypass gas turbine engine, in which a metal platform retainer ring is installed in accordance with the existing art.

FIGS. 1 and 6 schematically represent fragmentary cross-sectional views of, respectively, the aft and forward ends of a fan section 10 of a high-bypass gas turbine engine of the type for powering an aircraft. Components of the fan section 10 depicted in FIGS. 1 and 6 include a fan blade 12 mounted to a fan rotor disk 14, and a fan platform 16 circumferentially located between the blade 12 and an adjacent fan blade (not shown). The radially outer surface of the platform 16 defines part of the flowpath for air between the fan blades of the fan section 10. FIG. 1 further depicts a vane 18 and blade 20 of a booster compressor downstream of the fan section 10. The compressor blade 20 is mounted to a booster shaft or spool 22, which is coupled to the rotor disk 14 with bolts 24 (only one of which is shown). FIG. 6 further depicts a conical spinner 26 mounted forward of the rotor disk 14 and fan platform 16. It should be appreciated that, because of the axisymmetric configuration of the fan section 10, additional fan blades, fan platforms, compressor vanes and blades, bolts, etc., are not shown in FIGS. 1 and 6 due to the cross-sectional nature of these views. As also understood, the rotor disk 14 and compressor spool 22 and the blades 12 and 20 and spinner 26 mounted thereto rotate as a result of the spool 22 being powered by a low pressure turbine (not shown) of the engine. Other aspects of the fan section 10 and the operation of the engine are known in the art and therefore will not be discussed here in any detail.

FIGS. 1 and 6 further depict platform retainer rings 28 and 30 located forward and aft, respectively, of the platform 16. The forward retainer ring 28 is shown secured to the rotor disk 14 and the aft retainer ring 30 is shown secured to the spool 22. Similar to the platform 16, the radially outer surfaces of the retainer rings 28 and 30 define portions of the flowpath for air through the fan section 10. The retainer rings 28 and 30 also have structural functions as a result of each having a lug 32 and 34, respectively, that contacts the forward end 36 or aft end 38, respectively, of the fan platform 16 to secure the platform 16 within the fan section 10. The forward retainer ring 28 is shown as having a generally U-shaped cross-section, with a radially outer leg 40 that terminates with the lug 32. The outer leg 40 also defines an integral shroud that forms an inner flowpath boundary surface for air moving through the fan section 10. A radially inner leg 42 of the ring 28 defines a flange 44 by which the ring 28 is secured (bolted) to the rotor disk 14. The spinner 26 is shown secured (bolted) to a mid-portion 46 of the ring 28 between the legs 40 and 42. The aft retainer ring 30 is shown as having a cross-section that is generally V-shaped, with a radially outer leg 48 defining another inner flowpath boundary surface for air moving through the fan section 10. A radially inner leg 50 of the ring 30 defines a flange 52 by which the ring 30 is secured to the booster spool 22. The lug 34 of the ring 30 is defined at the intersection of the legs 48 and 50. The radially outer leg 48 of the ring 30 further defines a hook 54 for abutting a radially inward platform 56 of the compressor vane 18.

The forward and aft retainer rings 28 and 30 represented in FIGS. 1 and 6 provide a relatively simple structure for loosely capturing or retaining the platform 16 without any additional hardware. Axial and radial clearance may be provided between the platform 16 and the retainer rings 28 and 30 to allow the platform 16 to move in response to an impact, such as a bird strike, promoting the distribution and dissipation of the impact. Fan platform retention in this manner has been utilized in commercial aircraft engines, such as the GEnx® and GE90® engines manufactured by the General Electric Company. In these engines, the forward and aft platform retainer rings 28 and 30 are manufactured from metal, typically a titanium alloy, such as machined Ti-6Al-4V ring-rolled forgings. Though titanium alloy retainer rings 28 and 30 of the type shown in FIGS. 1 and 6 perform extremely well, the present invention provides retainer rings formed of composite materials and configured to achieve the structural performance of the retainer rings 28 and 30. In so doing, retainer rings of this invention provide the potential for reductions in both weight and cost over the titanium retainer rings 28 and 30 of FIGS. 1 and 6.

Figures 2, 3:
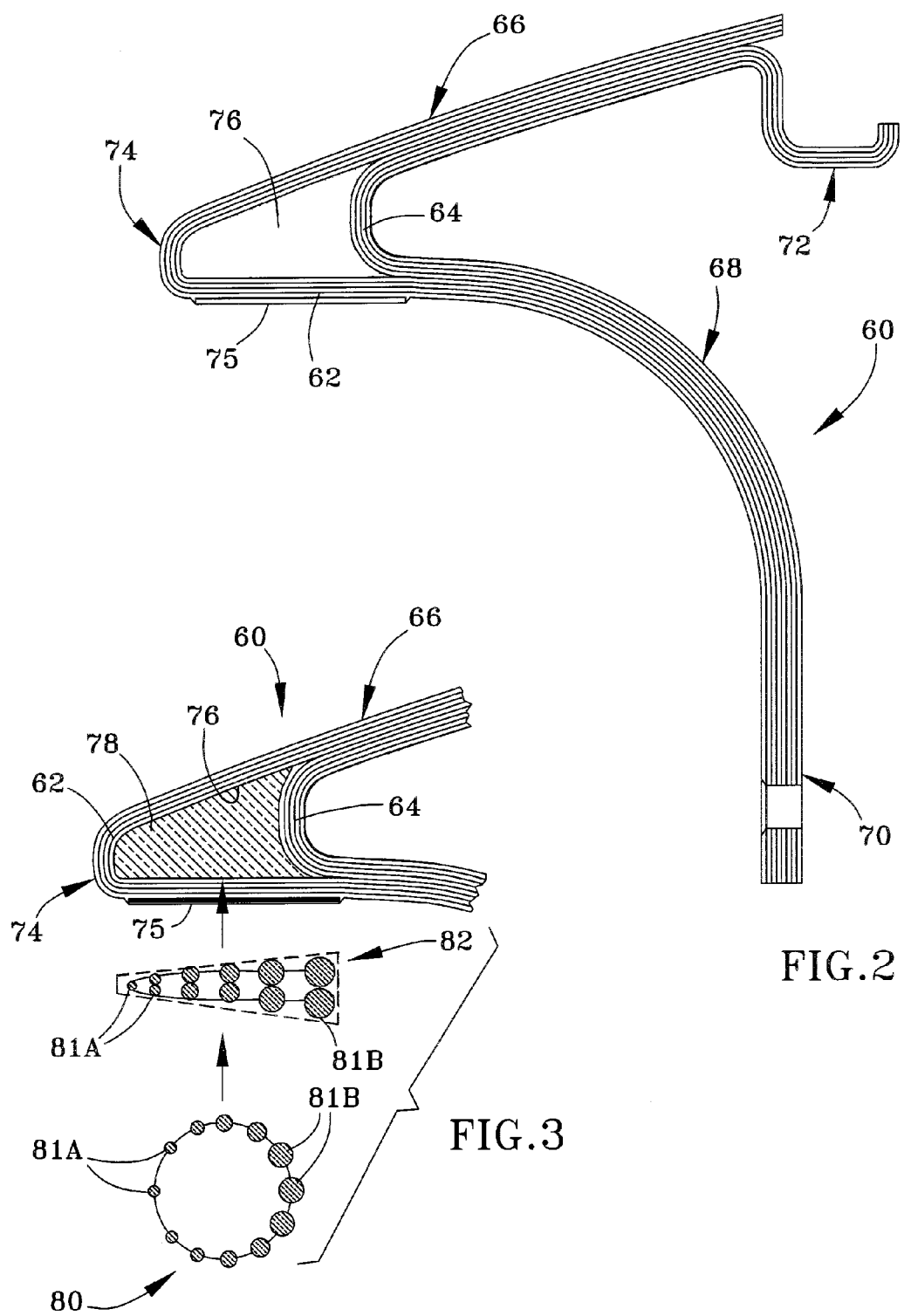
FIG. 2 schematically represents a cross-sectional view of a composite platform retainer ring suitable for replacing the metal platform retainer ring of FIG. 1 in accordance with an embodiment of the invention.
FIG. 3 schematically represents a cross-sectional view of a composite platform retainer ring suitable for replacing the metal platform retainer ring of FIG. 1 in accordance with another embodiment of the retainer ring.

FIG. 2 represents a composite aft platform retainer ring 60 capable of being interchangeable with the aft platform retainer ring 30 of FIG. 1, and as such requires a load-bearing capability. The retainer ring 60 is represented as being fabricated with two laminations 62 and 64 formed by two separate preforms. Each lamination 62 and 64 comprises multiple layers of a fibrous reinforcement material embedded in a matrix material, preferably a cured polymer material to yield a polymer matrix composite (PMC) material. Suitable processes for fabricating the preforms and retainer ring 60 using PMC materials are known in the art, and therefore will not be described here in any detail. The ring 60 can be fabricated using various resin-infusion processes, including but not limited to resin transfer molding (RTM). Because the ring 60 has surfaces required to be joined with other parts of the fan section 10 and define flowpath surfaces, hard tooling is preferably used to ensure that such surfaces are smooth.

The preforms that form the laminations 62 and 64 preferably have conformable architectures, such as biaxial or triaxial braid, though other architectures are foreseeable including weaves, non-crimp fabrics, and unidirectional fiber tows. Biaxial architectures can be used to take advantage of their ability to conform to complex geometries. Additional axial fiber tows can be placed at strategic locations within a biaxial braid for reinforcement and/or to stabilize the fiber architecture, yielding essentially a hybrid biaxial/triaxial braid. Triaxial architectures can be used to take advantage of their architectural stability and extra stiffness and strength. In all cases, additional fiber tows can be placed at selected locations in the preforms to meet thickness, stiffness and strength requirements of the laminations 62 and 64 and the composite retainer ring 60 as a whole.

The fabric layers may be formed of a variety of fibrous materials, nonlimiting examples of which include carbon (e.g., graphite), glass (e.g., fiberglass), and aramid (e.g., Kevlar®) fibers. A variety of polymeric materials can be chosen as the resin used to infiltrate the fabric layers. Because the principal role of the resin is to form a matrix material for the fibrous material of the fabric layers, with the result that the resin contributes to the structural strength and other physical properties of the retainer ring 60, the cured resin should have mechanical and physical properties suitable for the intended application. In addition, the resin should be compositionally compatible with the fibrous material of the fabric layers and be capable of curing under temperature conditions that will not thermally degrade or otherwise be adverse to the fibrous material. On this basis, particularly suitable resins materials include, but are not limited to, epoxy, bismaleimide, and polyimide resins. Suitable thicknesses for the individual fabric layers and the resulting laminations 62 and 64 will depend on the particular operating conditions of the retainer ring 60.

Similar to the aft retainer ring 30 of FIG. 1, the composite retainer ring 60 is shown as having a cross-section that is generally V-shaped, with a radially outer leg 66 that defines an integral flowpath shroud whose outer surface defines an inner flowpath boundary surface for air moving through the fan section 10 (FIG. 1) in which the ring 60 is installed. The outer leg 66 is shown as defining a hook 72 for abutting a radially inward platform 56 of the compressor vane 18, similar to the hook 54 of the retainer ring 30 in FIG. 1. A radially inner leg 68 of the ring 60 defines an integral flange 70 by which the ring 60 can be secured to the booster spool 22 (FIG. 1). A projection or lug 74 is defined at the intersection of the legs 66 and 68 and, similar to the lug 34 of the ring 30 in FIG. 1, provides an abutment surface 75 for retention of the fan platform 16 (FIG. 1). As represented in FIG. 2, a nonlimiting embodiment of the invention involves laying up the preforms that form the laminations 62 and 64 such that the flange 70 is defined by both laminations 62 and 64, the hook 72 is defined by the lamination 64, and the lug 74 is primarily defined by the lamination 62, resulting in an annular-shaped cavity 76 between the laminations 62 and 64 within the region of the ring 60 containing the lug 74. Alternatively, the lug 74 could be formed by both laminations 62 and 64.

Figure 4:
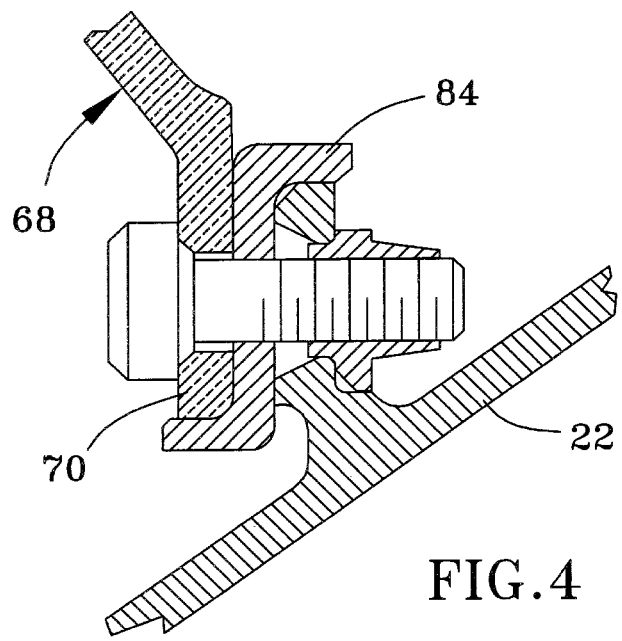
FIG. 4 represents a cross-sectional view of an intermediate flange assembled to either of the composite retainer rings of FIGS. 2 and 3.
Figure 5:
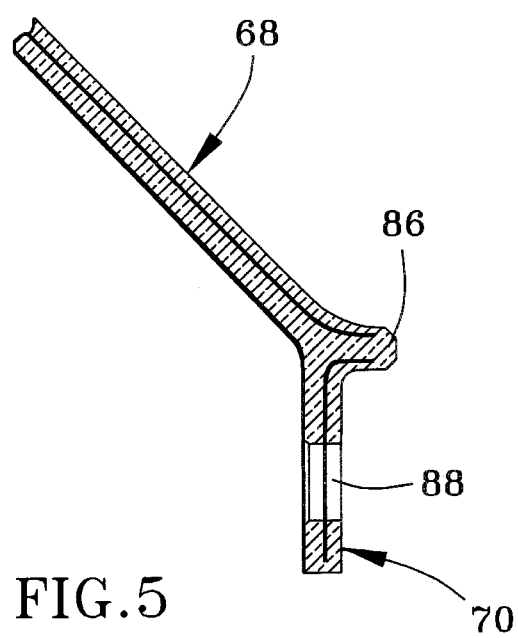
FIG. 5 schematically represents a cross-sectional view of a composite retainer ring suitable for replacing the metal retainer ring of FIG. 1, in which the ring is fabricated to have an integral composite rabbet in accordance with a third embodiment of the retainer ring.

FIGS. 3, 4 and 5 depict additional configurations of the aft retainer ring 60 in accordance with further embodiments of this invention. In these figures, consistent reference numbers are used to identify the same or functionally equivalent elements. In view of similarities between the embodiments, the following discussion of FIGS. 3, 4 and 5 will focus primarily on aspects of the additional embodiments that differ from the embodiment of FIG. 2 in some notable or significant manner. Other aspects of the additional embodiments not discussed in any detail can be, in terms of structure, function, materials, etc., essentially as was described for the first embodiment.

In the embodiment of FIG. 3, an insert 78 fills the cavity 76 between the laminations 62 and 64. The insert 78 is preferably constructed from a preform having continuous fibers oriented predominantly in the circumferential (hoop) direction of the ring 60 for carrying both circumferential and radial loads during rotation of the fan section 10. As represented in FIG. 3, the insert 78 has a roughly wedge or triangular shape corresponding to the shape of the cavity 76, and can be constructed from a separate preform or tape containing fiber reinforcement material or from hoop-wound uniaxial fibers, and the fibers within the insert 78 are continuous and oriented predominantly in the hoop direction of the ring 60 to carry circumferential and radial loads during engine operation. In a preferred embodiment, the insert 78 is fabricated from a laminate preform having a fiber architecture containing small angle triaxial or biaxial braids or unidirectional fiber tows. For example, FIG. 3 represents a triaxial braid tubular-shaped fabric (or "sock") 80 formed by fiber tows 81a and 81b of different diameters placed at selected locations in the sock 80, which is then diametrically flattened to form a preform 82 of the insert 78. As seen in FIG. 3, the preform 82 has a wedge-shaped cross-section, and fiber tows 81a and 81b having smaller and larger diameters, respectively, are located in different hemispheres of the sock 80. As also shown in FIG. 3, as a result of flattening the sock 80, the smaller and larger diameter fiber tows 81a and 81b are located within the narrower and wider axial ends, respectively, of the preform 82. The preform 82 may contain any number of socks 80 to build up the desired thickness of the insert 78.

The integral flange 70 on the retaining ring 60 preferably utilizes a rabbet feature for assembly and alignment with the booster spool 22. FIG. 4 shows a metallic intermediate flange 84 that can be used with the embodiments of FIGS. 2 and 3 to secure the flange 70 of the retainer ring 60 to the booster spool 22 and promote load distribution. The hybrid composite/metallic design of FIG. 4 provides for the cost and weight savings associated with composites as well as cost reductions associated with the smaller and less intricate metal flange 84. As an alternative, the embodiment of the retainer ring 60 shown in FIG. 5 includes an integral composite rabbet 86 formed by a fourth lamination 88 for the purpose of eliminating the metallic intermediate flange 84 of FIG. 4.

Figure 7:
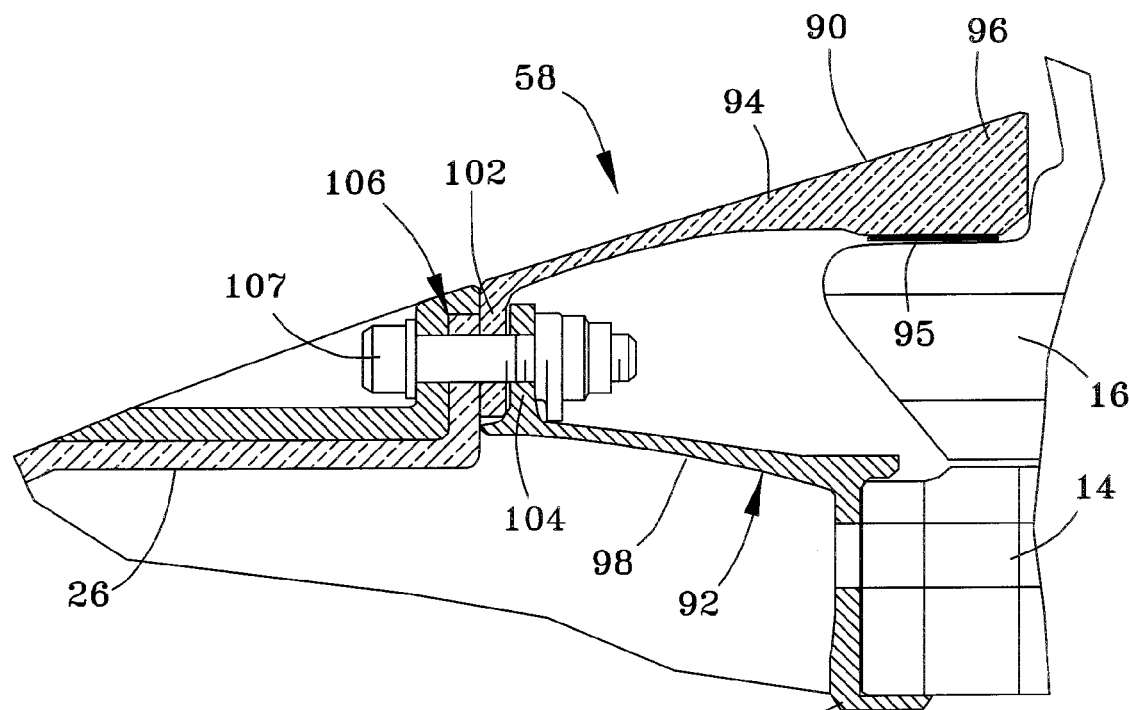
FIG. 7 schematically represents a cross-sectional view of a composite platform retainer ring installed in the forward end of a fan section of a high-bypass gas turbine engine in accordance with an embodiment of the invention.
Figure 8:
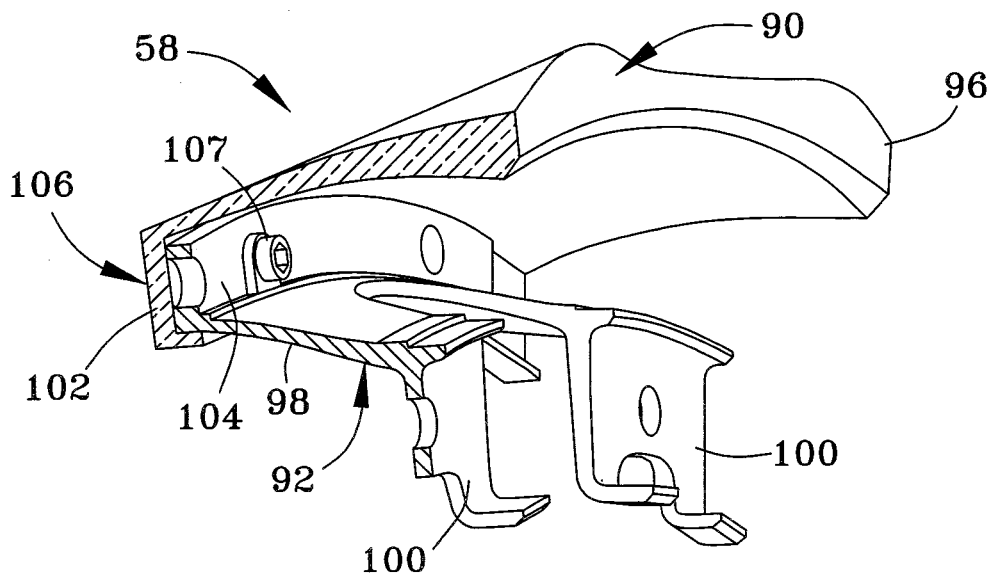
FIG. 8 schematically represents a perspective view of a retainer ring assembly comprising the composite platform retainer ring of FIG. 7 and a metal flange in accordance with another embodiment of the retainer ring.
Figure 9:
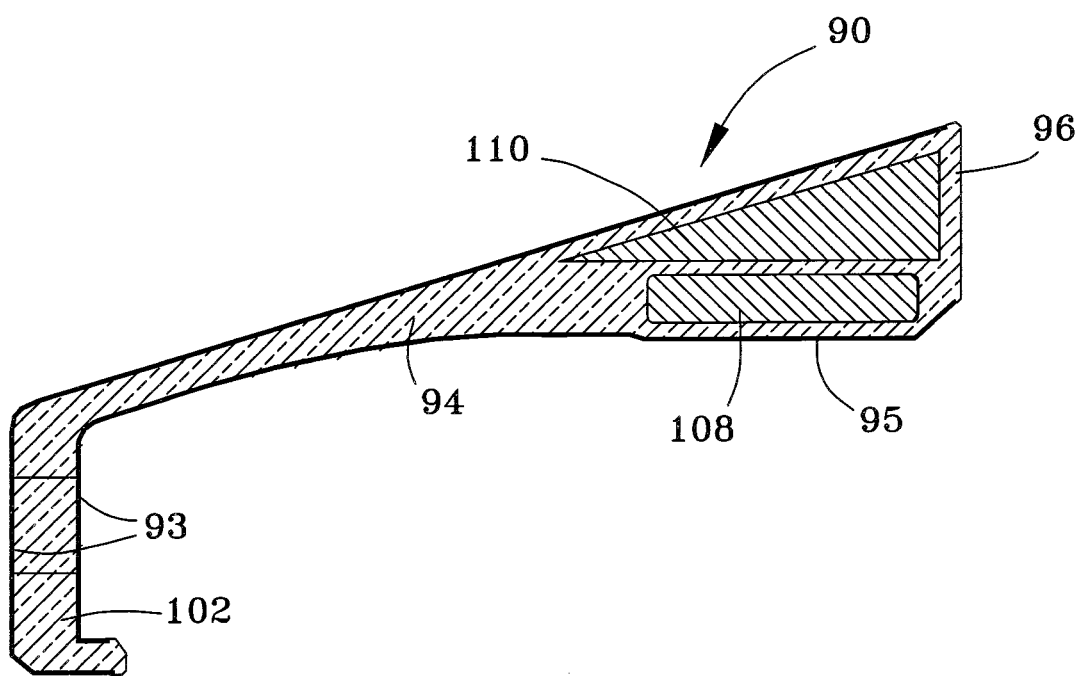
FIG. 9 schematically represents a cross-sectional view of the composite platform retainer ring of FIGS. 7 and 8.

FIG. 7 is a detailed view showing the forward platform retainer ring 28 of FIG. 6 as having been replaced with a forward platform retainer ring assembly 58 comprising a composite ring 90 and a metal flange 92. FIG. 8 is an isometric view of the ring assembly 58, and FIG. 9 is an isolated cross-sectional view of the composite ring 90. Similar to the composite aft retainer ring 60 of FIGS. 2 through 5, the composite ring 90 is fabricated from at least one PMC lamination 93. As such, the discussion regarding the materials and fabrication of the aft retainer ring 60 are applicable to the composite ring 90, and will not be repeated here.

Similar to the forward retainer ring 28 of FIG. 6, the forward retainer ring assembly 58 of FIG. 7 has a generally U-shaped cross-sectional profile, with a radially outer leg 94 that forms an integral shroud whose outer surface defines an inner flowpath boundary surface for air moving through the fan section 10. In contrast to the retainer ring 30 of FIGS. 2 through 5, the outer leg 94 terminates with a projection or lug 96 that defines an abutment surface 95 for retention of the fan platform 16. A radially inner leg 98 of the ring assembly 58 defines a flange 100 by which the ring assembly 58 is secured (bolted) to the rotor disk 14. The spinner 26 is shown as supported by the ring assembly 58 as a result of being secured with bolts 107 to a midportion 106 of the ring assembly 58 between the legs 94 and 98. As evident from FIGS. 7 and 8, the composite ring 90 defines the outer leg 94 of the ring assembly 58, the metal flange 92 defines the inner leg 98 of the ring assembly 58, and flange portions 102 and 104 of the ring 90 and flange 92 overlap each other to define the midportion 106 of the ring assembly 58. As such, the integral shroud that defines the inner flowpath boundary surface for air moving through the fan section 10 is defined by the composite ring 90, and particularly the outer leg 94 defined by the composite ring 90, and the lug 96 that defines the abutment surface 95 is defined by the composite ring 90, and particularly the distal end of the outer leg 94 defined by the composite ring 90. While shown as being fabricated separately, it is foreseeable that the composite ring 90 could be fabricated as an integral portion of the spinner 26 to further simplify the design and reduce the weight.

FIG. 9 is a cross-sectional view of the composite ring 90 showing the placement of two inserts 108 and 110 within the lug 96 at the distal end of the outer leg 94. Both inserts 108 and 110 are preferably fabricated from preforms that are separate from the laminate preform(s) used to integrally form the outer leg 94 and flange portion 102 of the composite ring 90. Similar to the insert 78 of the aft retainer ring 60 of FIGS. 2 to 5, the purpose of the insert 108 is to carry both circumferential and radial loads during rotation of the fan section 10. For this reason, and similar to the insert 78 of FIG. 3, the insert 108 is preferably constructed from a separate preform or tape containing fiber reinforcement material or from hoop-wound uniaxial fibers, and the fibers within the insert 108 are continuous and oriented predominantly in the hoop direction of the composite ring 90. The remaining insert 110 is disposed radially outward from the insert 108, and is intended to create a scalloped outer contour visible in the view of FIG. 8. The insert 110 may be a single insert whose thickness varies in the circumferential direction of the composite ring 90, or can be one of multiple inserts selectively placed along the circumference of the composite ring 90 to create the scalloped outer contour.

Figure 10:
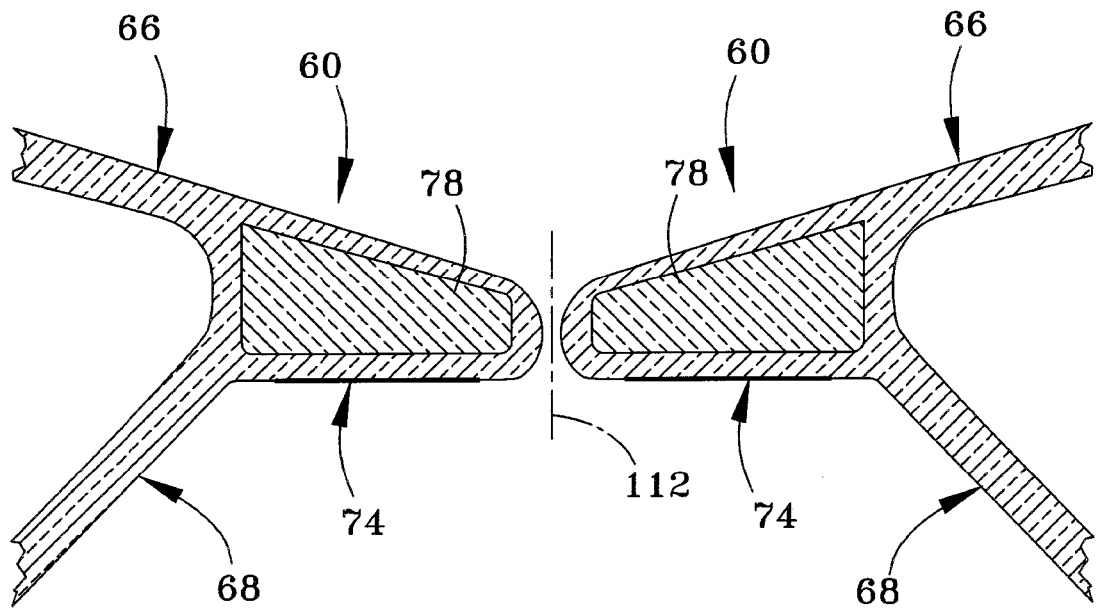
FIGS. 10 and 11 schematically represent a technique by which the rings of FIGS. 1-5 and 6-9, respectively, can be fabricated in sets.
Figure 11:
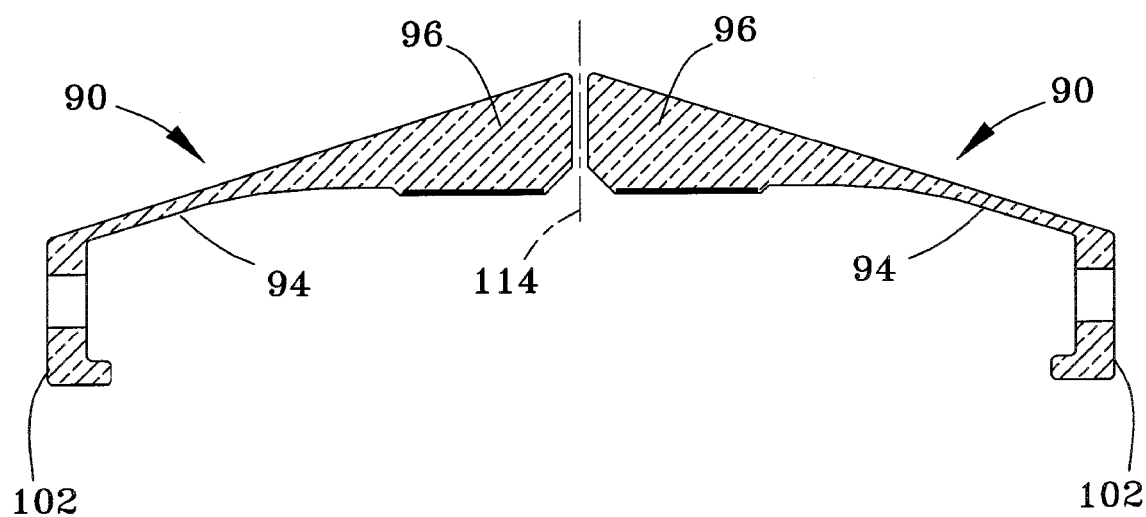

Finally, FIGS. 10 and 11 represent techniques by which the aft retainer ring 60 of FIGS. 2 to 5 and the composite ring 90 of FIGS. 6 to 9, respectively, can be fabricated in pairs. With proper tool design, preforms for multiple rings 60 and 90 can be laid up and fabricated together, simplifying the lay-up procedure and doubling the output of the manufacturing (for example, RTM) process. Following cure, the pairs of rings 60 and 90 can be separated at locations indicated by lines 112 and 114 in FIGS. 10 and 11, respectively.

While the invention has been described in terms of specific embodiments, it is apparent that other forms could be adopted by one skilled in the art. Therefore, the scope of the invention is to be limited only by the following claims.

The invention claimed is:

1. A process comprising fabricating a composite load-bearing rotating ring for a rotating machine, the fabricating step comprising:
    forming multiple preforms, at least a first preform of the multiple preforms having a laminate architecture containing a polymer matrix material and a fibrous reinforcement material and at least a second preform of the multiple preforms containing a polymer matrix material and a fibrous reinforcement material oriented predominantly in a circumferential direction of the composite load-bearing rotating ring for carrying both circumferential and radial loads during rotation of the composite load-bearing rotating ring; and then
    curing the polymer matrix materials of the first and second preforms to bond the multiple preforms together and yield the composite load-bearing rotating ring, at least a first portion of the composite load-bearing rotating ring defining an integral abutment surface adapted to abut and retain hardware of the rotating machine, at least a second portion of the composite load-bearing rotating ring defining an integral flange adapted to secure the composite load-bearing rotating ring to a support structure of the rotating machine, and the second preform forms an insert within the composite load-bearing rotating ring, the insert being located within the first portion of the composite load-bearing rotating ring defining the integral abutment surface.

2. The process according to claim 1, wherein the multiple preforms are formed to include a third preform having a laminate architecture containing a polymer matrix material and a fibrous reinforcement material, the process further comprising laminating the first and third preforms together to define the integral flange and an integral shroud of the composite load-bearing rotating ring.

3. The process according to claim 2, wherein the first and third preforms are laminated together to define a cavity therebetween, and the second preform is located within the cavity and forms the insert within the cavity as a result of the curing step.

4. The process according to claim 3, wherein the second preform is formed by fabricating a tubular-shaped fabric and then diametrically flattening the tubular-shaped fabric.

5. The process according to claim 4, wherein the tubular-shaped fabric comprises fiber tows of different diameters, the fiber tows having smaller diameters being located within a first hemisphere of the tubular-shaped fabric, and the fiber tows having larger diameters being located within a second hemisphere of the tubular-shaped fabric diametrically opposite the first hemisphere.

6. The process according to claim 5, wherein the second preform has a wedge-shaped cross-section so as to have a narrower axial end and a wider axial end, and the first and second hemispheres of the tubular-shaped fabric form the narrower and wider axial ends, respectively, of the second preform as a result of diametrically flattening the tubular-shaped fabric.

7. The process according to claim 1, further comprising installing the composite load-bearing rotating ring in a fan section of a gas turbine engine so that the integral abutment surface abuts and retains a fan platform of the fan section, and the integral flange secures the composite load-bearing rotating ring to the support structure of the fan section.

8. The process according to claim 7, further comprising installing a metallic intermediate flange between the integral flange of the composite load-bearing rotating ring and the support structure of the fan section.

9. The process according to claim 7, wherein the second portion of the composite load-bearing rotating ring further defines an integral composite rabbet that engages the support structure as a result of installing the composite load-bearing rotating ring.

10. The process according to claim 7, further comprising assembling the composite load-bearing rotating ring with a metal flange by attaching the integral flange of the composite load-bearing rotating ring to the metal flange, and then securing the metal flange to the support structure of the fan section.

11. The process according to claim 10, further comprising securing the integral flange of the composite load-bearing rotating ring to a spinner of the fan section.

12. The process according to claim 1, wherein the composite load-bearing rotating ring comprises at least a third portion that defines an integral shroud and an inner flowpath boundary surface of the rotating machine, and the first portion of the composite load-bearing rotating ring defining the integral abutment surface is a lug between the second and third portions of the composite load-bearing rotating ring.

13. The process according to claim 1, wherein the composite load-bearing rotating ring comprises at least a third portion that defines an integral shroud and an inner flowpath boundary surface of the rotating machine, and the first portion of the composite load-bearing rotating ring defining the integral abutment surface is located at a distal end of the integral shroud.

14. The process according to claim 1, further comprising:
    assembling the multiple preforms so that curing the polymer matrix materials of the first and second preforms produces a second composite load-bearing rotating ring bonded to the composite load-bearing rotating ring; and then
    separating the second composite load-bearing rotating ring from the composite load-bearing rotating ring.

15. A composite load-bearing rotating ring for a rotating machine, the composite load-bearing rotating ring comprising:
    at least a first portion defining an integral abutment surface adapted to abut and retain hardware of the rotating machine;
    at least a second portion defining an integral flange adapted to secure the composite load-bearing rotating ring to a support structure of the rotating machine; and
    an insert within the composite load-bearing rotating ring, the insert being located within the first portion of the composite load-bearing rotating ring defining the integral abutment surface;
    wherein each of the first and second portions and the insert of the composite load-bearing rotating ring contains a polymer matrix material and a fibrous reinforcement material, and the fibrous reinforcement material within the insert is oriented predominantly in a circumferential direction of the composite load-bearing rotating ring for carrying both circumferential and radial loads during rotation of the composite load-bearing rotating ring.

16. The composite load-bearing rotating ring according to claim 15, wherein the first portion of the composite load-bearing rotating ring defining the integral abutment surface is a lug between the second portion defining the integral flange and a third portion of the composite load-bearing rotating ring that defines an integral shroud and an inner flowpath boundary surface of the rotating machine.

17. The composite load-bearing rotating ring according to claim 15, wherein the first portion of the composite load-bearing rotating ring defining the integral abutment surface is located at a distal end of the integral shroud.

18. The composite load-bearing rotating ring according to claim 17, further comprising a second insert containing a polymer matrix material and a fibrous reinforcement material, the second insert being located radially outward of the insert and defining a scalloped contour at the inner flowpath boundary surface defined by the integral shroud.

* * * * *